United States Patent
Gilderman et al.

(10) Patent No.: US 10,740,286 B1
(45) Date of Patent: Aug. 11, 2020

(54) MIGRATION TASK VALIDATION BEFORE DATA MIGRATION

(71) Applicant: Amazon Technologies, Inc., Seattle, WA (US)

(72) Inventors: Ilia Gilderman, Bellevue, WA (US); Nicolas Anton Medhurst Hertl, Edmonds, WA (US); Gal Eliraz Levonai, Newton, MA (US); Edward Paul Murray, Sammamish, WA (US); Michael J. Russo, Seattle, WA (US); John MacDonald Winford, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 241 days.

(21) Appl. No.: 15/688,655

(22) Filed: Aug. 28, 2017

(51) Int. Cl.
| | | |
|---|---|---|
| *G06F 16/11* | (2019.01) | |
| *G06F 9/50* | (2006.01) | |
| *G06F 16/16* | (2019.01) | |
| *G06F 16/21* | (2019.01) | |

(52) U.S. Cl.
CPC .......... *G06F 16/119* (2019.01); *G06F 9/5038* (2013.01); *G06F 16/168* (2019.01); *G06F 16/214* (2019.01)

(58) Field of Classification Search
CPC .... G06F 16/119; G06F 16/168; G06F 16/214; G06F 9/5038
See application file for complete search history.

(56) References Cited

U.S. PATENT DOCUMENTS

| | | | |
|---|---|---|---|
| 6,044,444 A | 3/2000 | Ofek | |
| 7,080,225 B1* | 7/2006 | Todd | G06F 3/061 |
| | | | 711/154 |
| 7,325,014 B1* | 1/2008 | Kennedy | G06F 16/2365 |
| 9,514,132 B2 | 2/2016 | Resch et al. | |
| 9,996,562 B2* | 6/2018 | Higginson | G06F 16/214 |
| 10,185,727 B1* | 1/2019 | Wilton | G06F 16/214 |
| 10,509,696 B1* | 12/2019 | Gilderman | G06F 11/079 |
| 2003/0163783 A1* | 8/2003 | Chikirivao | G06N 5/022 |
| | | | 715/234 |
| 2006/0294120 A1* | 12/2006 | Li | G06F 16/213 |
| 2008/0228550 A1 | 9/2008 | Tan et al. | |
| 2009/0012981 A1* | 1/2009 | Kogoh | G06F 8/64 |
| 2010/0274766 A1* | 10/2010 | Nagashima | G06F 3/0625 |
| | | | 707/654 |
| 2011/0276893 A1* | 11/2011 | Yambal | G06Q 30/01 |
| | | | 715/745 |
| 2013/0198476 A1* | 8/2013 | Nakajima | G06F 3/0607 |
| | | | 711/165 |

(Continued)

*Primary Examiner* — Jerry B Dennison
(74) *Attorney, Agent, or Firm* — Robert C. Kowert; Kowert, Hood, Munyon, Rankin & Goetzel, P.C.

(57) ABSTRACT

Validation of a migration task to migrate data from one data store to another may be performed prior to the migration of the data. Parameters associated with the migration may be evaluated according to one or more types of validations for the migration task. In some embodiments, users may specify the validations to perform for the migration task. A determination as to whether the migration task is valid may be performed for the migration task based on the parameter evaluations. A result indicating whether the migration task is valid may be provided to a user.

20 Claims, 10 Drawing Sheets

(56) References Cited

U.S. PATENT DOCUMENTS

| | | | |
|---|---|---|---|
| 2013/0326038 A1* | 12/2013 | Bodik | G06F 9/4856 709/223 |
| 2014/0165063 A1* | 6/2014 | Shiva | G06F 9/45533 718/1 |
| 2014/0222766 A1* | 8/2014 | Sitt | G06F 16/119 707/687 |
| 2015/0269053 A1* | 9/2015 | Kato | G06F 11/34 718/105 |
| 2017/0097839 A1* | 4/2017 | Hart | G06F 9/5088 |
| 2017/0097855 A1* | 4/2017 | Hart | G06F 9/5088 |
| 2017/0277698 A1* | 9/2017 | Heard | G06F 16/119 |
| 2018/0095953 A1* | 4/2018 | Mayer | G06F 16/214 |
| 2019/0171433 A1* | 6/2019 | Groseclose | G06F 8/76 |
| 2019/0205429 A1* | 7/2019 | Lee | G06F 16/119 |

* cited by examiner

US 10,740,286 B1

MIGRATION TASK VALIDATION BEFORE DATA MIGRATION

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data stores or data formats that offer different processing or maintenance capabilities. However, introducing multiple data formats is not without cost. Data is often processed by different systems which may not support the current data format of the data. Thus, the ability to perform techniques to move data between data stores that offer different capabilities, locations, or formats is desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of migration task validation before data migrations are described herein. Data migration may be performed in various embodiments in order to move data from a current location to a desired new location. The new location may, for instance, utilize a different storage engine or have different storage capacity (or other hardware capabilities) that make accessing the data more desirable, in some embodiments. Data migration techniques may transform or otherwise modify the data as part of migration, in various embodiments. For example, data stored in a source data store may be stored in a data format (e.g., a file format, schema, etc.) that is different the data format used or supported by the target data store, in some embodiments. Data migration, therefore may convert the data from the format of the source data store to the format of the target data store, in one embodiment.

Figure 1:
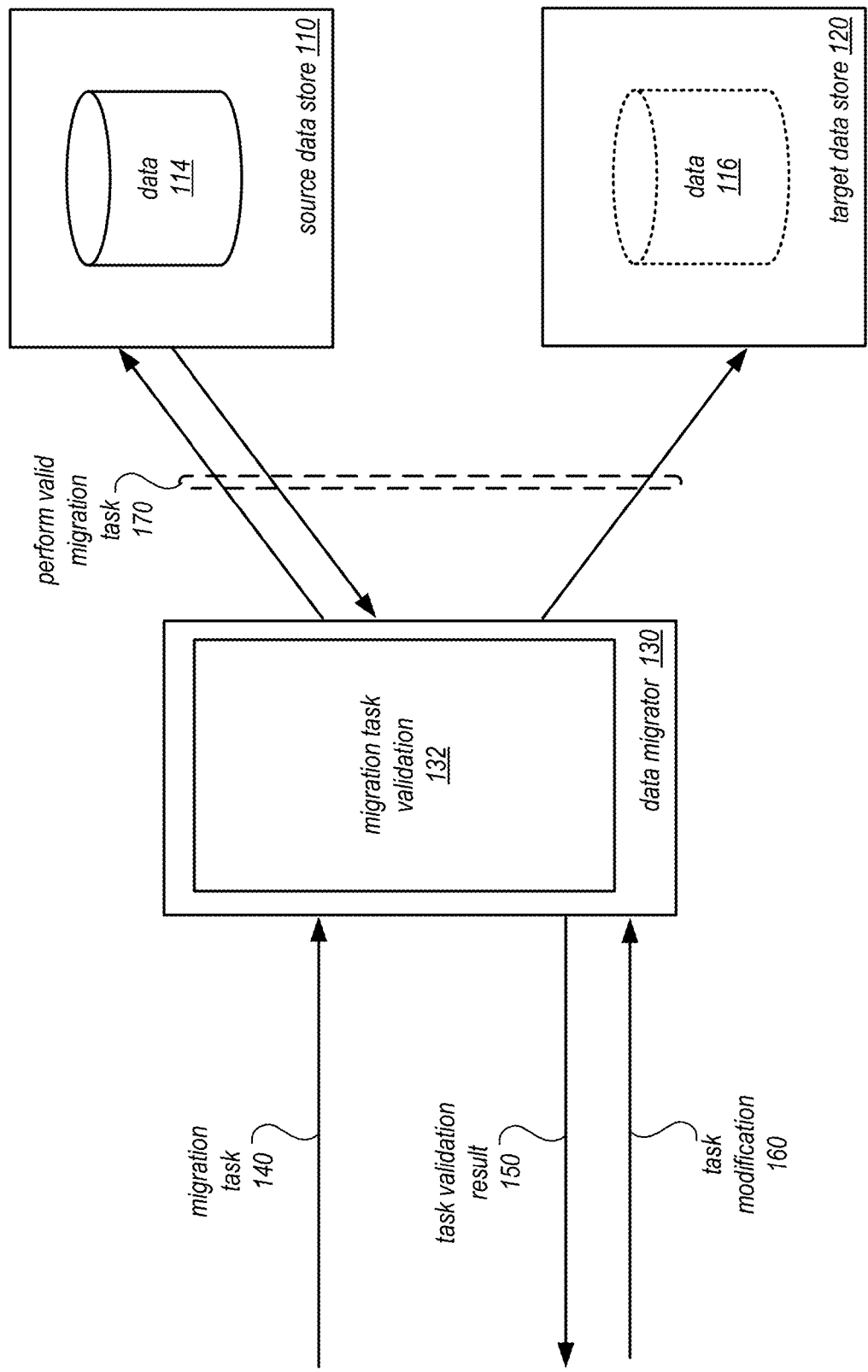
FIG. 1 is a logical block diagram illustrating migration task validation before data migrations, according to some embodiments.

Because data migrations can move large amounts of data, data migration operations may be costly in terms of resources and time to perform, in some embodiments. When data migrations fail to complete due to errors or fail to provide correct results (even if all of the data is migrated) due to errors, the resulting loss in resources and time may be great, in one embodiment, because the entire migration may need to be performed again (in addition to time spent identifying the error and performing a corrective action). Error detection and mitigation that can be performed before data migrations, however, can significantly reduce the costs of data migration errors by identifying and correcting errors before the errors occur. FIG. 1 is a logical block diagram illustrating migration task validation before data migrations, according to some embodiments.

Source data store 110 may store data 114. Source data store 110 may be various kinds of database system (e.g., relational or non-relational), file system, object store (e.g., a key-value object store), virtualized storage device (e.g., virtual block-based storage devices, such as virtual hard disk drives), or any other data store that may store data 114. In some embodiments, source data store 110 may store data 114 according to a data format which may be an arrangement, schema, or other manner in which the data is stored at source data store (e.g., logically or physically) that may be compatible with how source data store 110 provides access to the data. If, for instance, source data store 110 is a data warehouse that is compatible with data store in a column-oriented storage format, then the data format may be a column-oriented format in which data 114 is stored.

A migration task 140 may be submitted, created, or otherwise provided to data migrator 130 be performed to move data 114 to a target data store 120. Target data store 120 may also be various kinds of database system (e.g., relational or non-relational), file system, object store (e.g., a key-value object store), virtualized storage device (e.g., virtual block-based storage devices, such as virtual hard disk drives), or any other data store that may store data 114. Similarly, target data store 120 may implement a same data format (resulting in a homogenous migration) or a different data format (resulting in a heterogeneous migration) that may be a different arrangement, schema, or other manner in which the data is stored at source data store (e.g., logically or physically) that may be compatible with how target data store 120 provides access to the data. Migration task 140 may include operations to obtain portions of data 114 (e.g., records, entries, objects, folders, files, etc.) and transform the obtained portions for storage in target data store to be a version of the data (or create an exact copy of some or all of data 114), data 116, that is stored in target data store 120. Other operations may include filtering, aggregating, dividing, calculating over, appending, or otherwise altering data 114 as it is stored to target data store 120 in some embodiments.

Data migrator 130 may perform migration task 140. Data migrator 130 may be implemented as part of a third party system, service or host, as discussed below with regard to FIGS. 2-5D or as part of either source data store 110, target data store 120, or both data stores 110 and 120, in some embodiments. Prior to the performance of migration task 140, data migrator 130 may implement migration task validation 132. Migration task validation 132 may perform user-selected or enabled validations or validations selected by default or selectively by data migrator 130.

Different types of validations may evaluate different parameters associated with migration task 140, in some embodiments. Examples of parameters may include parameters configuring or specifying the data types for items to be used at the target data store, configuring or specifying various operations to convert, truncate, modify, reformat, divide, combine, filter, calculate, or otherwise derive new or existing values or items within the data, configuring or specifying a character set, configuring or specifying a network configuration for migrating the data, configuring or specifying permissions to access data, configuring or specifying the source and/or target data store configurations, configuring or specifying migration task execution configurations (e.g., including logging settings, or other performance settings), and/or configuring or specifying data formats, schemes, or other arrangement information for the data.

Data migrator 130 may provide a result of the validation 150 to a user, which may indicate whether the migration task is valid (either in entirety or valid/invalid portions thereof), in some embodiments. In this way, a user may perform task modifications 160 to change the migration task to correct invalid parameters, so that a valid migration task 170 can be performed. Task validation result 150 may include recommended corrective actions or alternative target data stores, in some embodiments, as discussed in detail below with regard to FIGS. 3, 5A-5D, and 8.

Please note that the previous description of migration task validation before data migrations is a logical illustration and thus is not to be construed as limiting as to the architecture for implementing a data store, data migrator, migration task validation, or migration operations.

This specification begins with a general description of a provider network that implements data migration service that migrates data both within and outside of the provider network and which performs validation of a migration task prior to the migration of the data. Then various examples of the data migration service including different components/modules, or arrangements of components/module that may be employed as part of implementing the data migration service are discussed. A number of different methods and techniques to implement migration task validation before data migrations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
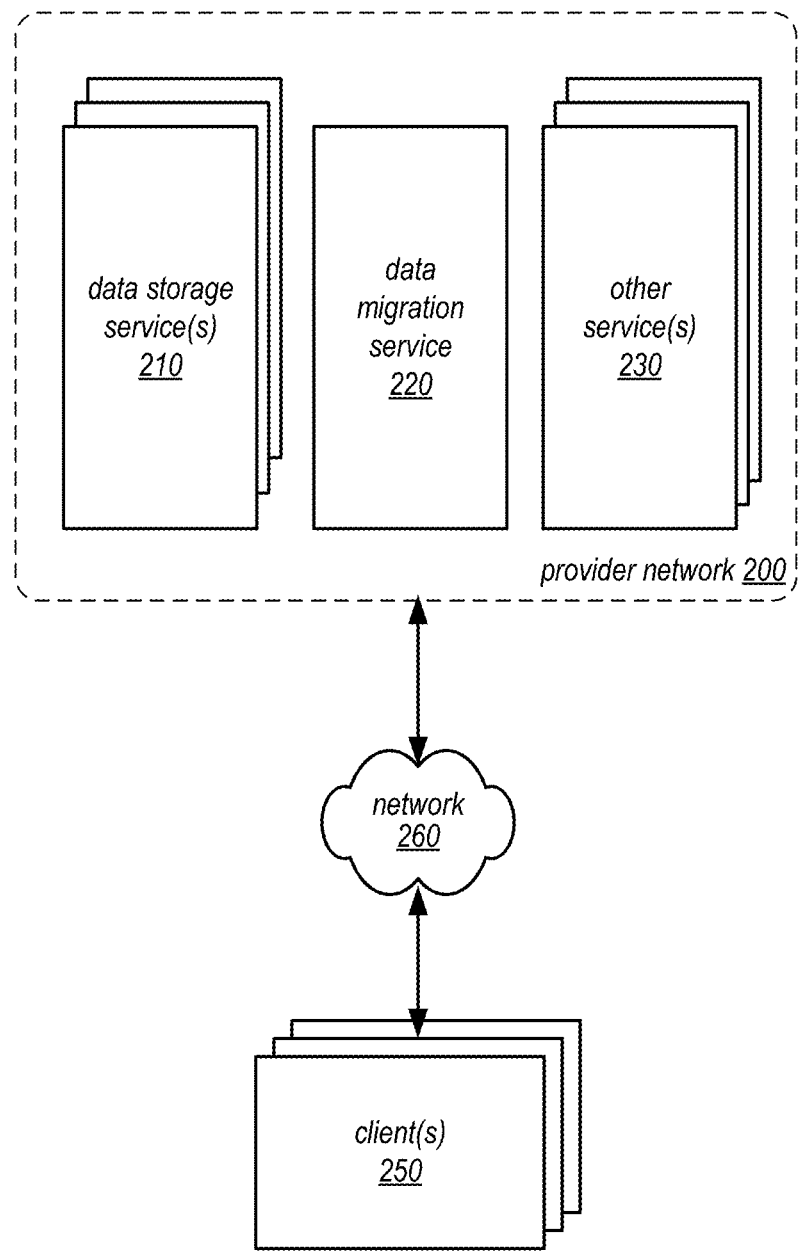
FIG. 2 is a logical block diagram illustrating a provider network offering different services including a data migration service that performs migration task validation before data migrations, according to some embodiments.

FIG. 2 is a logical block diagram illustrating a provider network offering different services including a data migration service that performs migration task validation before data migrations, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as a data storage service(s) 210 (e.g., database services, object storage services, block-based storage services, or data warehouse storage services), data migration service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs), command line interfaces, and/or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Figure 3:
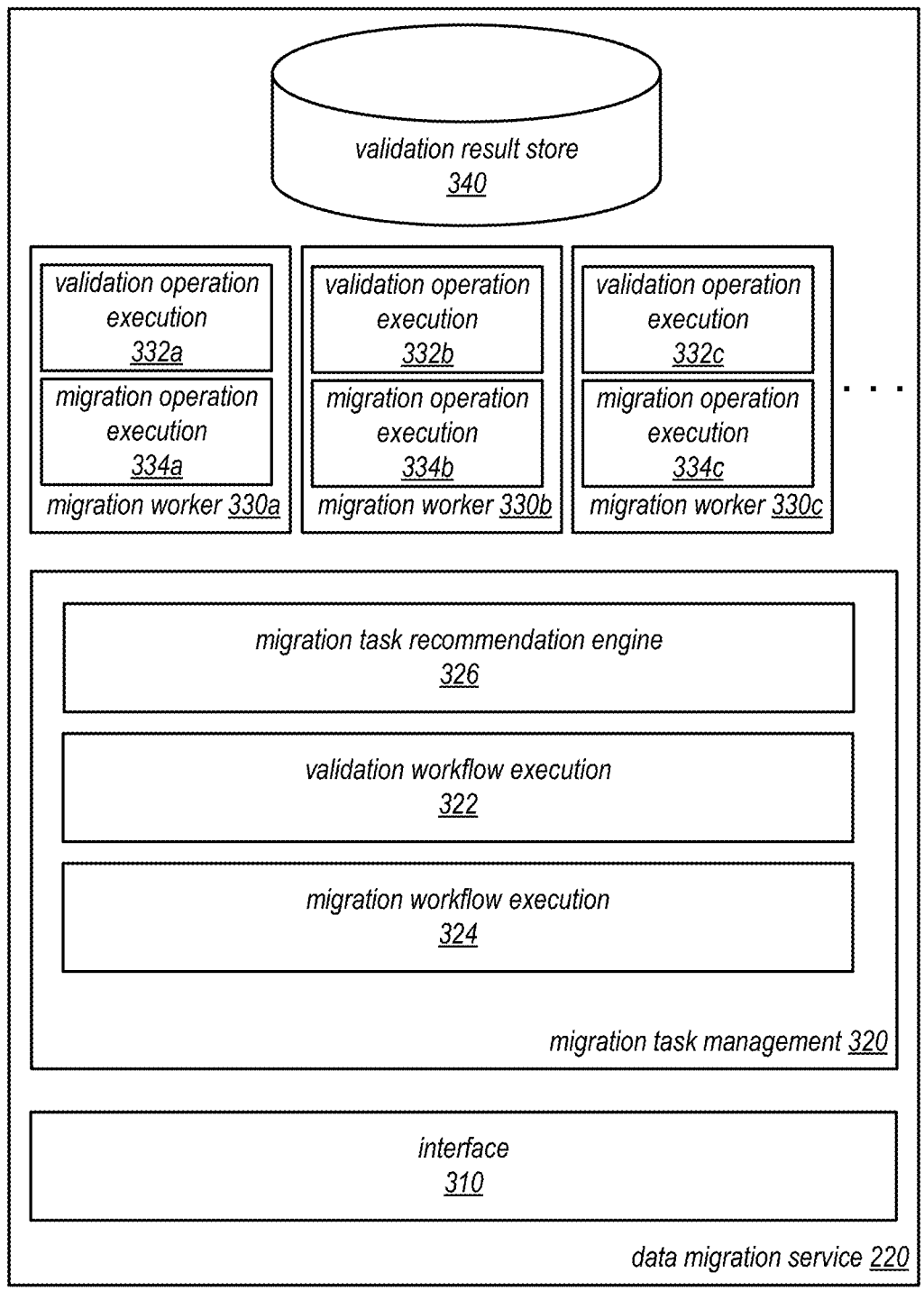
FIG. 3 is a logical block diagram illustrating a data migration service, according to some embodiments.

In some embodiments, data migration service 220 may perform data migrations between data stores. For example, data migration service 220 may perform homogenous migrations where the source and target data stores are the same or are compatible (e.g., the same or compatible storage engines, such as the same database engines). In some embodiments, data migration service 220 may perform heterogeneous migrations, where the source and target data stores are different or otherwise not compatible (e.g., different or incompatible storage engines, schemas, file or other data formats, such as different database engines). One or both of source or target data stores may be external to provider network 200 in some embodiments. Alternatively, one or both of source or target data stores may be hosted or implemented within provider network 200 (e.g., on the same or different storage services 210). For heterogeneous migrations, data migration service 220 may automatically convert the data format (e.g., database schema) to a format compatible with the target data store (e.g., a target database schema), in some embodiments. Data migration service 220 may consolidate or combine multiple data sets into a single data store (e.g., multiple databases into one database). FIG. 3 provides further discussion of data migration service 220 below. Data migration service 220 may perform a single copy of data from one data store to another or may provide continuous replication of changes at a source data store to a target data store, in some embodiments.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of data migration 220 in order to invoke the execution of a migration task to make data available for processing in a different location or data format for performing various processing operations with respect to data sets stored in data storage service(s) 210.

Generally speaking, clients 250 may encompass any type of client that can submit network-based requests to provider network 200 via network 260, including requests for storage services (e.g., a request to create, read, write, obtain, or modify data in data storage service(s) 210, a request to create or initiate a migration task at data migration service 220, etc.). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.)

necessary to establish a networking link between given client 250 and the Internet as well as between the Internet and provider network 200. It is noted that in some embodiments, clients 250 may communicate with provider network 200 using a private network rather than the public Internet.

FIG. 3 is a logical block diagram illustrating a data migration service, according to some embodiments. Data migration service 220 may implement interface 310, in various embodiments. Interface 310 may provide support various types of interfaces, in some embodiments, including a programmatic interfaces (e.g., Application Programming Interfaces (APIs)), command line interfaces, and/or graphical user interfaces. In some embodiments, a management console or other component may coordinate the generation and implementation of various graphical user interfaces, such as those discussed below with regard to FIGS. 5A-5d. Interface 310 may dispatch various requests to appropriate data migration service components, such as migration task management 320, as discussed below with regard to FIG. 4.

Data migration service may implement migration task management 320 to manage the resources performing data migration and direct the performance data migration according to received migration tasks. Migration task management 320 may generate workflows or other execution plans for migration tasks, in some embodiments. For example, depending on the configuration of the task, migration task management 320 may include different operations within a workflow to perform a task. For instance, heterogeneous migrations may include operations to convert, transform, or otherwise modify data taken from one data store in order to be compatible with a scheme in a target data store. In another example, a homogenous migration may include a configuration that filters out some data when the data is migrated so that it is not included in the data in the target data store. Migration task management 320 may create a workflow that includes filter operations to apply the desired filter. Migration task management 320 may implement migration workflow execution 324 to generate and or direct the performance of a migration task according to the parameters of the migration task that are received. In some embodiments, migration workflow execution 324 may track which migration tasks have been validated so that upon a request to perform a migration task that has already been validated, the validations may not be performed to migrate different data according to the same migration task (e.g., migrating another partition from the same source data store to the same target data store), in some embodiments.

In some embodiments migration task management 320 may implement validation workflow execution 322 to generate validation workflows for performing validations identified for a migration task. For example, different types of validations may be enabled or otherwise specified as part of the creation of the migration task (or via a separate request). Validation workflow execution 322 may generate and direct the performance of the validation workflow generated according to the enabled/specified validations. Various validations of parameters, discussed in further detail below with regard to FIG. 6 may include, but are not limited to, parameters configuring or specifying the data types for items to be used at the target data store, configuring or specifying various operations to convert, truncate, modify, reformat, divide, combine, filter, calculate, or otherwise derive new or existing values or items within the data, configuring or specifying a character set, configuring or specifying a network configuration for migrating the data, configuring or specifying permissions to access data, configuring or specifying the source and/or target data store configurations, configuring or specifying migration task execution configurations (e.g., including logging settings, or other performance settings), and/or configuring or specifying data formats, schemes, or other arrangement information for the data, in some embodiments.

In at least some embodiments, migration task management 320 may implement migration task recommendation engine 326 to determine recommended corrective actions or alternative target data stores based on the results of validations performed for a migration task. For example, as discussed in more detail below with regard to FIG. 8, corrective actions (e.g., changes to the parameter value or other changes to the migration task that remove the invalid parameter) may be identified based on a knowledge base or other mapping information that maps parameters to correct or valid values. In some embodiments, machine learning techniques may be performed to generate models that can recommend or select a corrective action based on the invalid parameter (and possibly other features of the migration task) based on tracking received parameter value changes from users in response to identified validation errors. Similarly, in some embodiments, migration task recommendation engine 326 may determine an alternative target data store to cure invalid parameters that may be identified. For example, if the invalid parameter requests that a data type for one item or object within the data be utilized in the target data store and the target data store does not support that data type, then a target data store that does support that data type may be identified.

Figure 4:
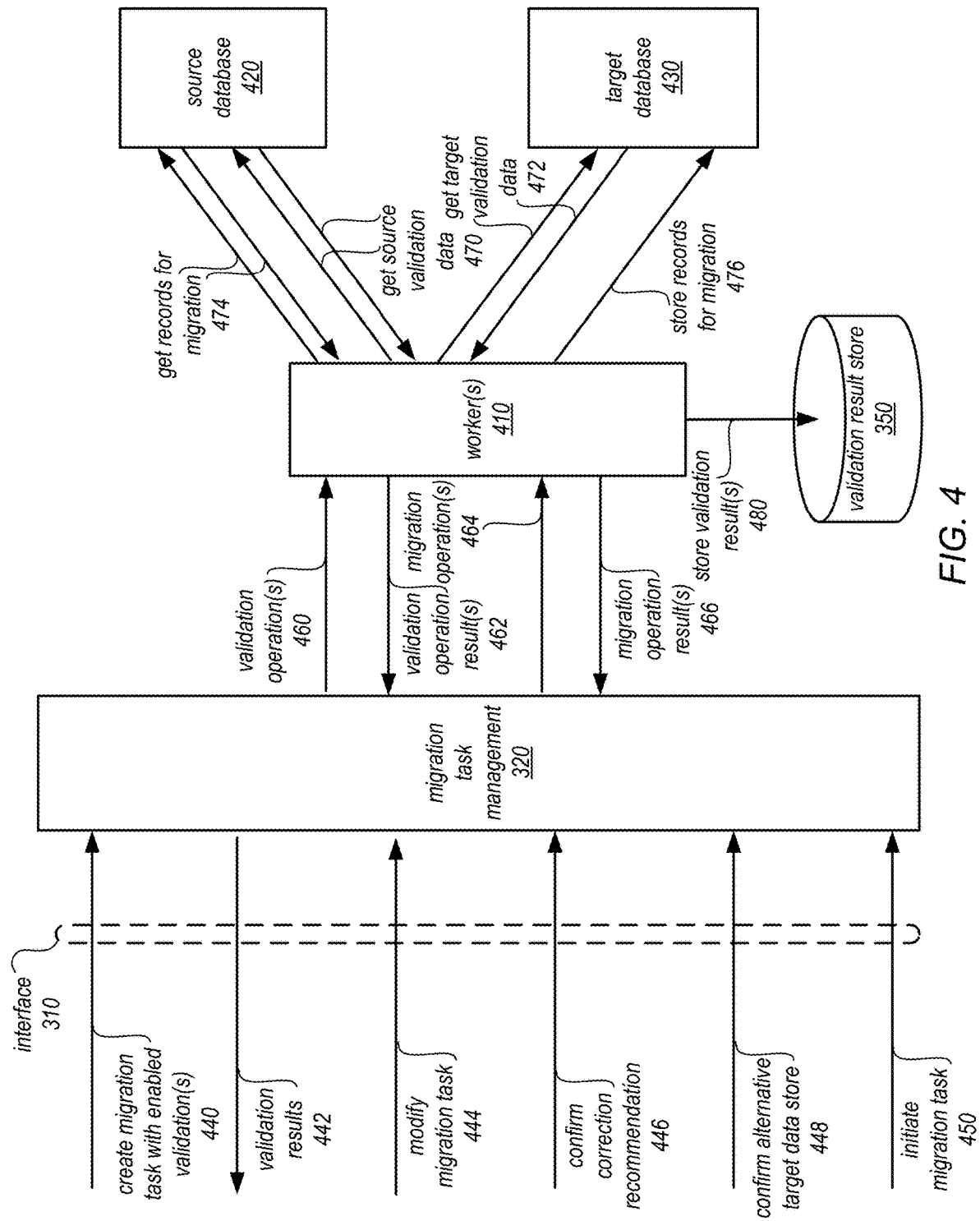
FIG. 4 is a data flow diagram illustrating the performance of migration task validation and data migrations, according to some embodiments.

Migration task management 320 may determine and provision the appropriate number of migration workers 330 to perform a migration. Although FIG. 4 illustrates a single migration worker, in some embodiments, parallel or distributed execution of a migration task may be performed amongst a group of migration works for a single migration task. Migration task management 320 may track the status of migration tasks, restart or resume migration tasks, and clean up, release, scrub or prepare migration workers 330 for performing another migration task, in some embodiments.

Data migration service 220 may implement multiple migration workers, such as migration workers 330a, 330b, 330c, and so on, in various embodiments. Migration workers 330 may perform the various operations to perform heterogeneous and homogenous migrations, in some embodiments. For example, migration workers may implement migration operation execution engines or platforms, 334a, 334b, 334c, and so on, to perform various migration operations, including operations to read, convert, truncate, modify, reformat, divide, combine, filter, calculate, write, or store data in order to migrate data from a source data store to a target data store, in some embodiments. Migration workers may log operation results or status in migration task log, in some embodiments. Similarly, migration workers 330 may receive and perform validation operations from validation workflow execution 322. Migration workers 330 may implement validation operation execution engine or platform, 332a, 332b, 332c, and so on, to perform validation operations such as operations to validate the various parameters discussed above and below with regard to FIG. 6. Migration workers may store the results of validation operations to validation result store 340 (which may be implemented as part of data migration service 220 or a separate data store or service), in some embodiments.

FIG. 4 is a data flow diagram illustrating the performance of migration task validation and data migrations, according to some embodiments. As discussed above clients may submit requests via interface 310 to perform different operations in data migration service 220. For example, a request to create a migration task with specified or enabled validation(s) 440 may be received at migration task management 320 via interface 310. Migration task management 320 may identify the validation(s) to perform for the migration task and instruct validation operation(s) 460 to worker 410 (which may obtain access privileges and other information in order to obtain the information needed to perform the enabled validation. For example, migration worker 410 may get source validation data 470 and target validation data 472 from source database 420 and target database respectively, in some embodiments. Other data may be obtained from a local knowledge based, as discussed above, or from other sources—not illustrated.

Figure 6:
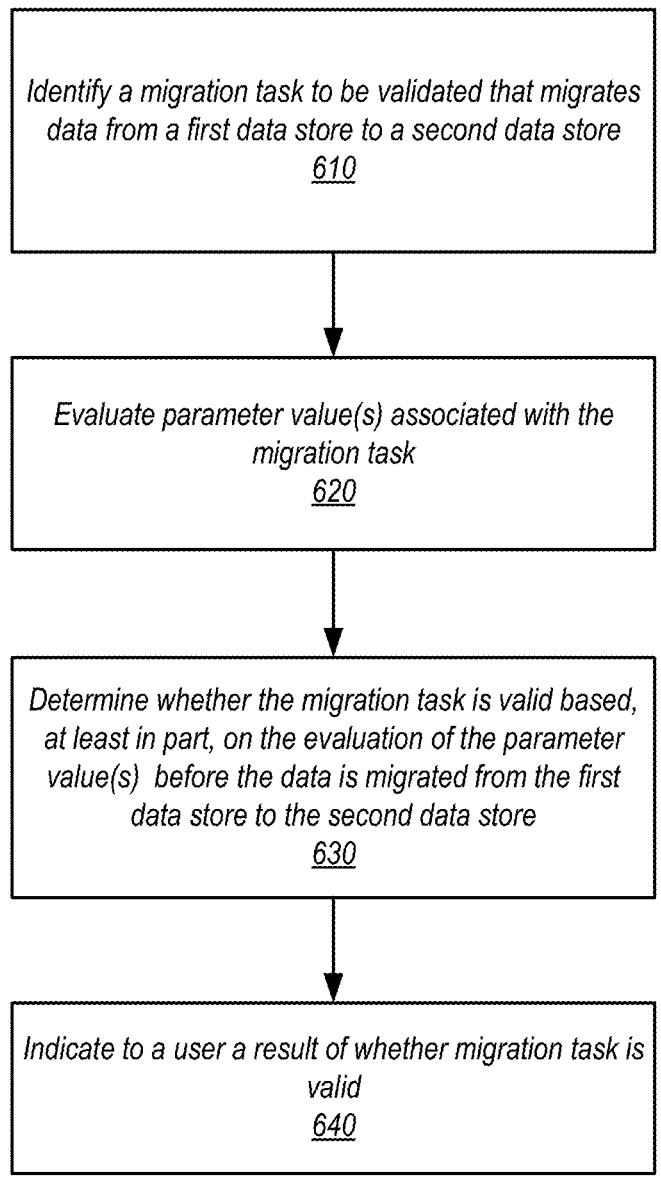
FIG. 6 is a high-level flowchart illustrating methods and techniques to implement migration task validation before data migrations, according to some embodiments.

Worker 410 may perform the various validations (such as the various validations discussed below with regard to FIG. 6) according to the validation operations 460 directed by migration task management. Results of operations may be provided 462 to migration task management 320 in order for migration task management 320 to select further operations according to the validation workflow or provide validation results 442. Worker 410 may also store validation results 480 in validation results store 350, which may be directly accessed by users or clients in some embodiments (e.g., via link provided as part of validation results 442).

Based on the results, requests to modify the migration task 444 may be performed in order to change parameter values of the migration task to cure, avoid, modify, or otherwise handle invalid parameter values for a migration task. As discussed below with regard to FIGS. 5A-8, corrective actions may be recommended and confirmed via request 446. Migration task management 320 may then perform the correction recommendations specified in the request 446, in some embodiments. Similarly, as discussed below with regard to FIGS. 5A-8, alternative target data stores may be recommended and confirmed via request 448. Migration task management 320 may then perform the modifications to the migration task to point the migration to the recommended target data store, in some embodiments.

Clients may then submit a request to initiate the migration task (which may have been corrected, modified, or altered to include a different target data store as discussed above). Migration task management 320 may direct migration operation(s) 464 to worker(s) 410 which may perform various operations discussed above, including operations to get records for migration 474 form source database 420 and store the records 476 (or portions thereof which may be modified) to target database 430. Worker(s) 410 may report the results of migration operation(s) 466 to migration task management 320 which may select or direct further migration operations until the migration task is complete, in some embodiments.

Figure 5A:
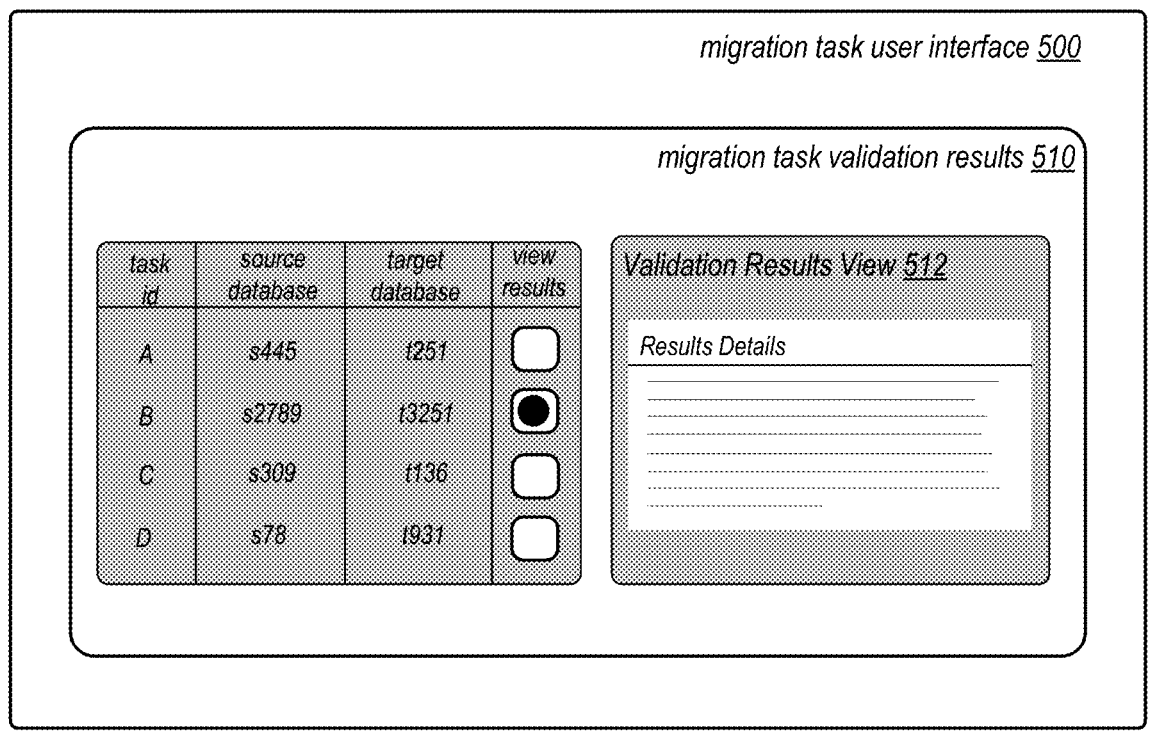
FIGS. 5A-5D are example user interfaces for migration task validation, according to some embodiments.

FIG. 5A is an example migration task validation results user interface, according to some embodiments. Migration task user interface 500 may be implemented as part of interface 310 of data migration service 220. Migration task user interface 500 may implement various graphical user interface elements, such as buttons, dials, text entry, drop down lists, popup windows, or other display/interface elements to perform various migration task operations (e.g., including the creation, modification, or deletion of migration tasks, not illustrated). In some embodiments, migration task user interface 500 may implement migration task validation results element 510, as illustrated in FIG. 5A.

Migration task validation results 510 may display various migration tasks that have been created in data migration service 220. For example, migration task status may display various details such as a task identifier, (e.g., "A" "B" "C" "D"), source database or other storage service identifiers (e.g., "s445", "s2789", "s309", "s78"), target database or other storage service identifiers (e.g., "t251", "t3251", "t136", "t931"), current task status (e.g., "complete" "error" "in progress" or others not shown, such as "paused"). In some embodiments, view results user interface elements may be provided that allow a user to select the validation results of a migration task for display in validation results view 512. Validation results view 512 may display various kinds of validation information, such as identifying the outcome of individual validation(s) (or operations performed as part of the validation), including both valid or invalid indications, identifying only invalid parameter values, providing a link to a more detail result report, explanations of invalid parameters (or the risks/errors causes by allowing such invalid parameter values to remain unchanged), or corrective actions or recommended target data stores, as discussed in more detail below with regard to FIGS. 5C and 5D.

Figure 5B:
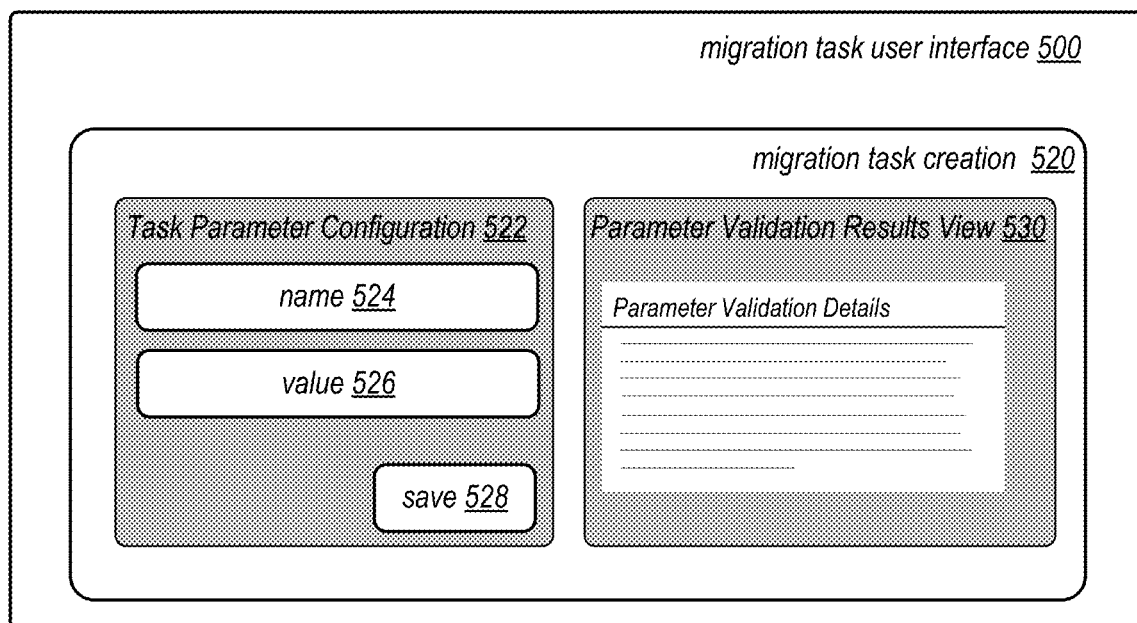

FIG. 5B is an example migration task user interface that implements a migration task creation element 520, in some embodiments. Instead of validating an entire migration task after creation of the migration task, validation may be performed interactively with for different migration task parameters. For example, migration task creation element 520 may include a user interface area, task parameter configuration 522 to allow for the configuration of migration task parameters. As illustrated in FIG. 5B, a parameter name 524 and value 526 may be input via user interface elements. In some embodiments, multiple parameters may be input at one time (e.g., all network configuration parameters). Save element 528 may allow the user to set or otherwise include the parameters according to the input name 524 and value 526. Selection of save element 528 may trigger validation of the parameters, in some embodiments. Results of the validation may be displayed in parameter validation results view 530. Similar to validation results view 512, parameter validation details may include valid or invalid indications, identifying only invalid parameter values, providing a link to a more detail result report, explanations of invalid parameters (or the risks/errors causes by allowing such invalid parameter values to remain unchanged), or corrective actions or recommended target data stores, as discussed in more detail below with regard to FIGS. 5C and 5D.

Figure 5C:
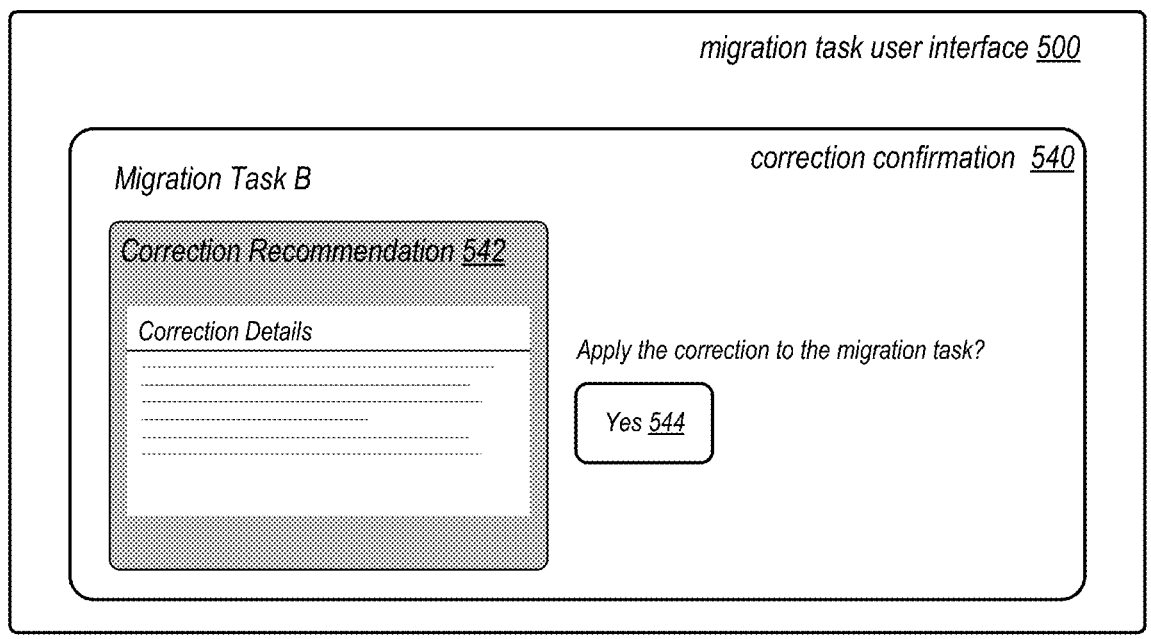

FIG. 5C is an example migration task user interface that implements a correction confirmation element 540, in some embodiments. Confirmation element 540 may include correction recommendation 542 for a migration task. Correction recommendation 542 may detail the one or more corrective actions that may be performed to cure the invalid parameter. In some embodiments, alternative corrective actions may be displayed (e.g., corrective actions that modify other parameter values which could also solve the problem). Users may select yes element 544 to perform the corrective action recommended, in various embodiments, automatically updating the migration task with a corrected parameter value. In some embodiments, correction details may describe manual corrective actions that a user may perform (e.g., via interface 310 to modify the migration task), in some embodiments and thus in such embodiments, yes element 534 may not be provided.

Figure 5D:
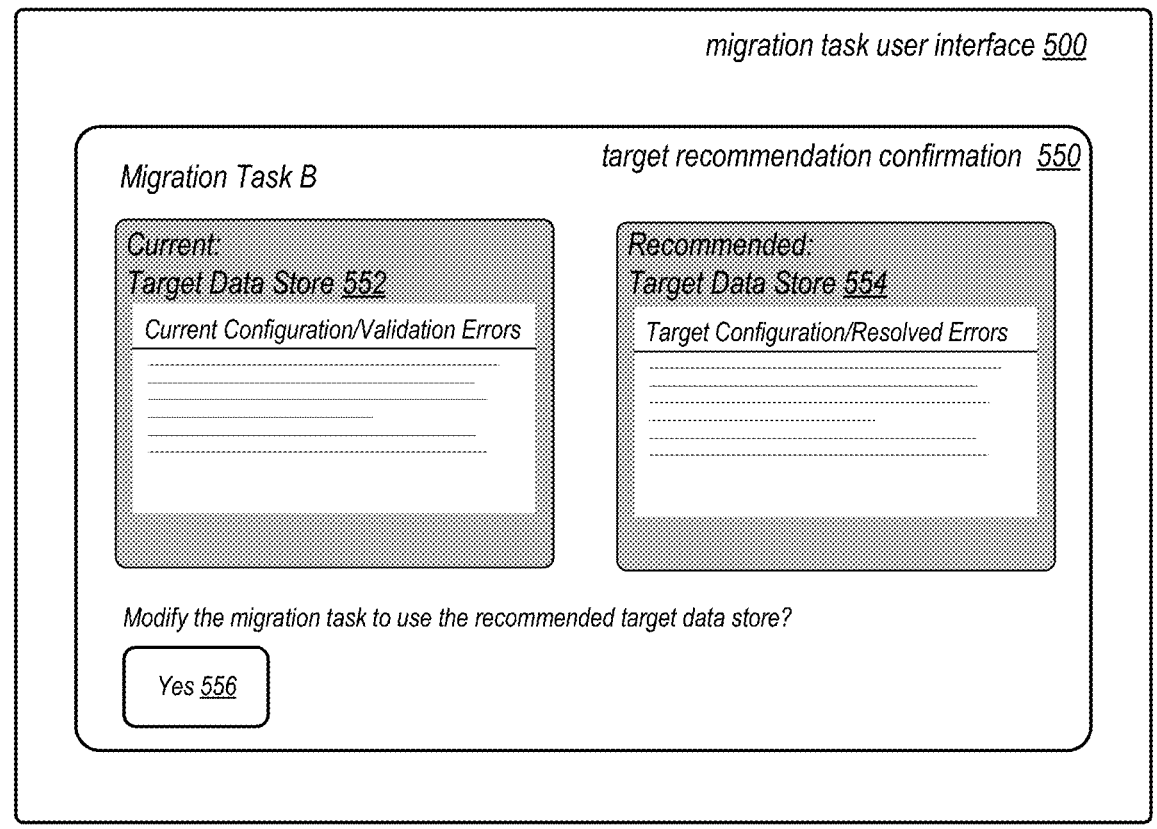

FIG. 5D is an example migration task user interface that implements a target recommendation confirmation element 550, in some embodiments. Target recommendation confirmation element 550 may include an element that displays a current target data store 552 selected for the migration task along with configuration or other validation errors. Target recommendation confirmation element 550 may also include a recommended target data store 554, and details concerning the solved invalid parameters or other errors if the target data store were to be used instead of the current target data store. Users may select yes element 556 to modify the migration task to select the recommended target data store in various embodiments, automatically updating the migration task with a corrected parameter value(s). In some embodiments, selection of yes element 556 may trigger provisioning services or requests to obtain a target data store according a recommend target data store 554 configuration (e.g., by submitting creation requests to an appropriate provider network service that hosts target data stores of the recommended type).

Please note that the prior example user interfaces described and illustrated in FIGS. 5A-5D are not intended to be limiting as to other types or graphical or other interfaces that may indicate results of migration task validation.

Although FIGS. 2-5D have been described and illustrated in the context of a data migration service, the various techniques and components illustrated and described in FIGS. 2-5D may be easily applied to other data access or management systems in different embodiments that may facilitate data migration operations, such as data stores or other services that offer extract transform load (ETL) processing operations. As such, FIGS. 2-5D are not intended to be limiting as to other embodiments of a system that may implement migration task validation before data migration. FIG. 6 is a high-level flowchart illustrating methods and techniques to implement migration task validation before data migration, according to some embodiments. Various different systems and devices may implement the various methods and techniques described below, either singly or working together. For example, a data migration service such as described above with regard to FIGS. 2-5D may implement the various methods. Alternatively, a combination of different systems and devices, such as a storage subsystem that manages access to data stored in directly attached storage devices may migrate data to another data store using migration task validation before data migration as described in the below techniques. Therefore, the above examples and or any other systems or devices referenced as performing the illustrated method, are not intended to be limiting as to other different components, modules, systems, or configurations of systems and devices.

As indicated at 610, a migration task that migrates data from a first data store to a second data store may be identified to be validated, in various embodiments. For example, a flag, marker, or other indication may be included in a validation creation request (or interaction task creation interface) that identifies the migration task for validation, in some embodiments. In some embodiments, a stored migration task (that has not yet been performed or was previously performed but may be performed again to migrate different data) may be selected or identified via a separate request for validation (e.g., a separate API call or selection of the migration task via a user interface element).

As discussed above with regard to FIG. 1, data stores may store data according to a data format, in at least some embodiments. For example, different file formats may be used to stored data that is accessed according to particular storage engine (e.g., a type of relational database storage engine). Different data stores may implement different storage engines (e.g., different relational database engines), and thus the migration of the data from the first data store to the second data store may include the modification, conversion, or transformation of the format data (e.g., from first format to second format). In some embodiments, the data stores may be homogenous, utilizing a same data format.

Different types of migration tasks may be performed, such as migrations that copy data as it exists at the time the migration begins or migrations that capture changes to the data at the first data store (e.g., source data store) and replicate them to the second data store (e.g., target data store)—even if that portion of the data has already been migrated, in some embodiments. The migration task may perform heterogeneous migrations that may include operations to convert, transform, or otherwise modify data taken from one data store in order to be compatible with a data format other scheme in a target data store. In another example, a homogenous migration may include a configuration that filters out some data when the data is migrated so that it is not included in the data in the target data store.

Migration tasks may be configured in various ways according to different parameters, as discussed above. Parameters of migration tasks may include, but are not limited to, parameters configuring or specifying the data types for items to be used at the target data store, configuring or specifying various operations to convert, truncate, modify, reformat, divide, combine, filter, calculate, or otherwise derive new or existing values or items within the data, configuring or specifying a character set, configuring or specifying a network configuration for migrating the data, configuring or specifying permissions to access data, configuring or specifying the source and/or target data store configurations, configuring or specifying migration task execution configurations (e.g., including logging settings, or other performance settings), and/or configuring or specifying data formats, schemes, or other arrangement information for the data.

As indicated at 620, parameter values associated with the migration task may be evaluated, in some embodiments. For example, a validation of parameters configuring or specifying the data types for items to be used at the target data store may access a knowledge base (or query the target data store) to determine which types are supported by the target data store. The parameter may point to a source data store scheme and request one or more of the data types in the scheme be used in the target data store. This listed of specified data types may be compared with the supported data types of the target data store. Parameters specifying unsupported data types may be identified, flagged, marked, or otherwise identified as invalid, in some embodiments.

In another example validation, parameters configuring or specifying various operations to convert, truncate, modify, reformat, divide, combine, filter, calculate, or otherwise derive new or existing values or items within the data may be evaluated. For example, conversion operations may be defined or perform in a manner that may introduce data loss or imprecision. The conversion operation may be tested on test values to determine whether or not the conversion performs as expected. If not, then the parameter specifying the conversion may be identified as invalid. Similar tests may be performed for other operations, in some embodiments. Other scheme or data format issues may also be detected (e.g., rules specifying table name or column name lengths), which may be dependent on the supported scheme or format of the target data store. User-defined data types may be migrated or converted, in some instances to other data types so that validation checks may be performed to see if the resulting output using the other data type is valid.

In another example validation, parameters configuring or specifying a character set, may be validated to determine whether or not the target data store supports the specified character (or national language support (NLS)). Validation may include checking the character set that is used in the source data store with supported character sets in the target data store, for example. In another example validation, parameters configuring or specifying a network configuration for migrating the data may be validated, in some embodiments. The network connections between different migration components or participants (e.g., source data store, target data store, migration worker, etc.) may be tested, including the specified source endpoint, target endpoint, by pinging or sending other test messages. Access credentials or information to establish the network connection, including a username and password, server name, port identifier, security group or other security identity, virtual private network connect, public network connect, etc. may be confirmed, in some embodiments. Similarly, in another example of a validation, parameters configuring or specifying the source and/or target data store permissions for users, roles, or other information used to access the data stores may be validated, including validating user permissions and passwords, rights permissions for particular items or groups of items (e.g., a table), operation permissions (e.g., for writing or reading), validating whether administrative permissions are needed, etc.

In some embodiments, validation of parameters configuring or specifying the source and/or target data store configurations may be performed. For example, various additional settings or configurations may be applied to target or source data stores to facilitate the performance of migration, including connection capabilities, archival or logging capabilities, performance optimization (e.g., prioritizing migration operations over other access operations to the data store), configurations to specify how reads, writes, or other data store operations are performed in response to migration requests, etc. In some embodiments, validation of parameters configuring or specifying migration task execution configurations may be performed, including checking for conflicting performance/executing settings (e.g., logging enabled and disabled), checking performance parameter values within valid ranges (e.g., within a threshold of parallel execution threads reading and copying data), logging or other reporting settings for a task, error handling, or other task performance configurations.

In some embodiments, validations may evaluate parameters configuring or specifying data formats, schemes, or other arrangement information for the data. For example, some key types (e.g., foreign key types) or other indexing structures (e.g., secondary indexes) may not be supported or replicated by the migration. Other examples include, identity columns, schema wild card or default values, or the number of supported tables, in some embodiments.

Evaluations of the example parameters discussed above may be performed by parsing a migration task request, document, workflow, or other data structure that specifies the parameters. The migration task may be parsed or otherwise processed to extract or separate out the parameters (e.g., a parse tree or graph) so that validation operations may be able to locate those parameters that should be evaluated, in some embodiments. A determination may be made based, at least in part on the validations of the parameter value(s) of whether the migration task is validated before the data is migrated from the first data store to the second data store. Because the validation is performed pre-flight, the invalid data parameters can be corrected, cured, or expected by the user. Validity of the migration task may be determined with respect to the entire migration task, or portions thereof, with differing levels of severity (as discussed below with regard to FIG. 8), in some embodiments.

As indicated at 640, a result of whether the migration task is valid may be indicated to a user, in some embodiments. The result may be indicated to a user by providing a link, address, or other identifier for a storage location that stores the result, in some embodiments. In some embodiments, the result may be indicated via an interface accessible to the user. The indicated result may identify outcome of individual validation(s) (or operations performed as part of the validation), including both valid or invalid indications. In some embodiments, the results may only identify invalid parameter values. Explanations of invalid parameters (or the risks/errors causes by allowing such invalid parameter values to remain unchanged) may be included in the results, in some embodiments. The results may include corrective actions or recommended target data stores, as discussed below with regard to FIG. 8, in some embodiments, and/or error severity classifications.

Figure 7:
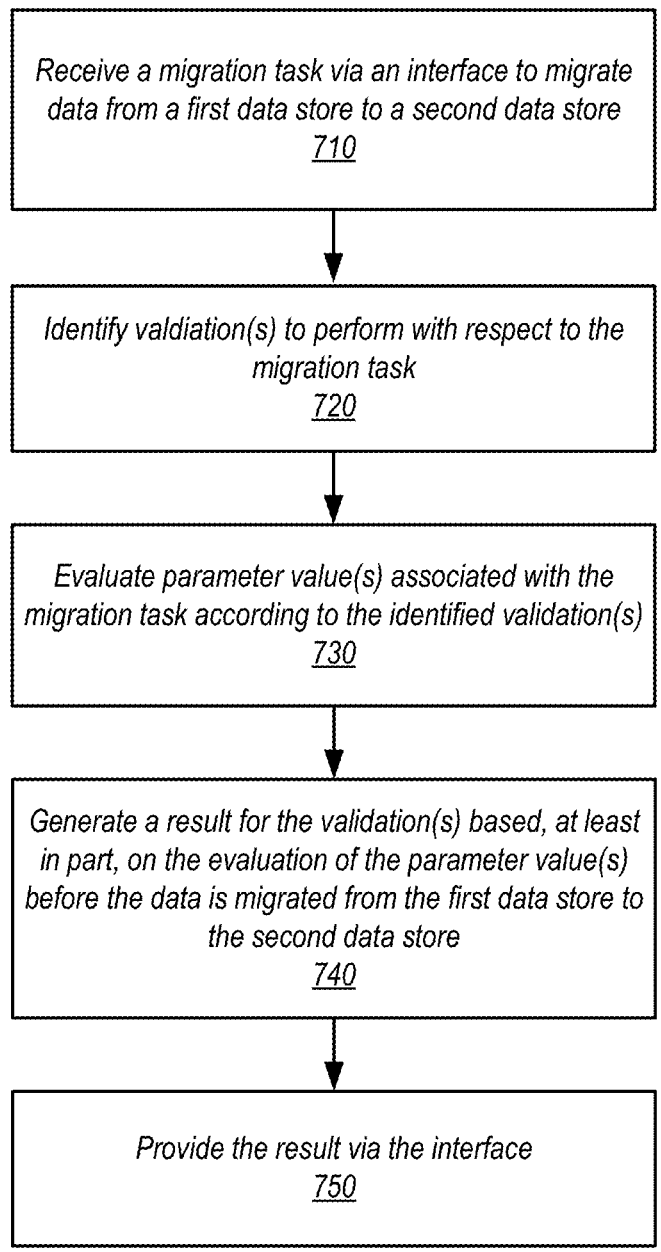
FIG. 7 is a high-level flowchart illustrating methods and techniques to implement configuration migration task validation before data migrations, according to some embodiments.

In some embodiments, migration task validation may be performed in response to user requests to create or initiate a migration task. The migration task may, as noted above, be configured to enable or select some validations while others may be left to default enablement or be explicitly blocked or prevented from running. FIG. 7 is a high-level flowchart illustrating methods and techniques to implement configuration migration task validation before data migrations, according to some embodiments. As indicated at 710, a migration task may be received via an interface to migrate data from a first data store to a second data store, in some embodiments, in some embodiments. The interface may be programmatic, graphical, or command-line, similar to interface 310 discussed above, in some embodiments. The migration task, as noted above, may include various configurations, variables or other parameters that may define, instruct, or otherwise determine the operations performed to migrate the data from the first data store to the second data store.

As indicated at 720, validation(s) to perform with respect to the migration task may be identified, in some embodiments. A default list of validation(s) may be used, in some embodiments, to select or identify which validations to perform. In at least some embodiments, the migration task may include settings or other information (e.g., as part of migration task creation API or migration task data object, such as a JavaScript Object Notation (JSON) document that), that may identify one or more validations to perform. In this way, a user can enable (or disable) validation(s) that are specific to the migration task (e.g., if there are validation errors or issues that are not a concern that can be ignored, then validation for those errors may be disable), which may increase the speed and performance of validation for the migration task.

As indicated at 730, parameter value(s) associated with the validation(s) may be evaluated according to the identified validations(s). For example, each validation that is identified may be included in a validation workflow that is generated for performing the validation, as discussed above with regard to FIGS. 3, 4 and 6. The parameters of the migration task to examine may be identified and evaluated according to the validation operations that are specified in the workflow, in such an example.

As indicated at 740, a result for the validation(s) may be generated based, at least in part, on the evaluation of the parameter value(s) before the data is migrated from the first data store to the second data store, in some embodiments. As discussed above with regard to element 640 in FIG. 6, the result may identify the outcome of individual validation(s)

(or operations performed as part of the validation), including both valid or invalid indications. In some embodiments, the results may only identify invalid parameter values. Explanations of invalid parameters (or the risks/errors causes by allowing such invalid parameter values to remain unchanged) may be included in the results, in some embodiments. The results may include corrective actions or recommended target data stores, as discussed below with regard to FIG. 8, in some embodiments, and/or error severity classifications.

Figure 8:
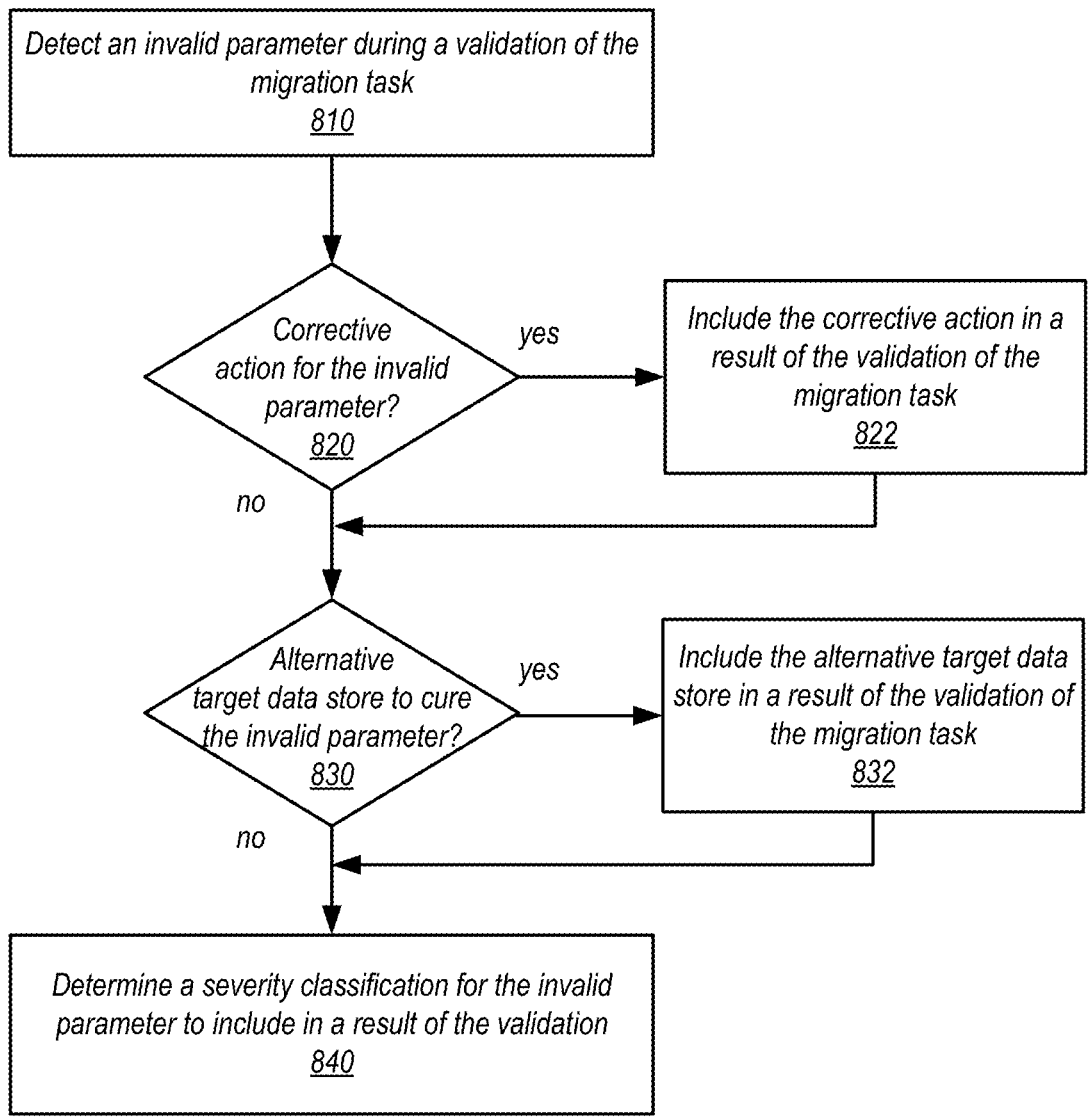
FIG. 8 is a high-level flowchart illustrating methods and techniques to generate a result of a validation of a migration task before a data migration, according to some embodiments.

Validation results may be provided in different ways, as discussed above. The form in which validation results are generated and the content of validation results may vary in different embodiments as well. The generation of validation results may be configurable by users (e.g., when identifying or enabling validation tests), in some embodiments. The prominence, organization, or level of detail or analysis provided with the validation results may also be configurable, in some embodiments. FIG. 8 is a high-level flowchart illustrating methods and techniques to generate a result of a validation of a migration task before a data migration, according to some embodiments.

As indicated at 810 an invalid parameter may be detected during validation of the migration task. For example, one of the many possible validation operations that may be applied to a migration task may identify a value that is invalid (e.g., rendering a migration operation inoperable due to an error) or a value that may cause invalid or other undesirable results (e.g., data stored in a wrong format or malformed due to poor modification).

As indicated at 820, a corrective action for the invalid parameter may be identified, in some embodiments. For example, corrective actions (e.g., changes to the parameter value or other changes to the migration task that remove the invalid parameter) may be identified based on a knowledge base or other mapping information that maps parameters to correct or valid values. In some embodiments, machine learning techniques may be performed to generate models that can recommend or select a corrective action based on the invalid parameter (and possibly other features of the migration task) based on tracking received parameter value changes from users in response to identified validation errors. If one of the correct or valid values can be determined for the invalid parameter, then an action may be generated (e.g., from a template or other action store) that can perform the corrective action to specify the one correct value. As indicated by the positive exit from 820, the corrective action may be included in the result of the validation of the migration task, in some embodiments. For example, a script, directions, or other information to manually perform the corrective action (e.g., by a user utilizing an interface like interface 310 discussed above) may be provided in the results. In some embodiments, a user interface element (e.g., a programmatic interface call or graphical user interface element) may be included that if selected triggers performance of the corrective action.

As indicated at 830, in some embodiments an alternative target data store to cure the invalid parameter may be identified. For example, if the invalid parameter requests that a data type for one item or object within the data be utilized in the target data store and the target data store does not support that data type, then a target data store that does support that data type may be identified. Similar to corrective actions, alternative target data store recommendations may be identified based on a knowledge base or other mapping information that maps supported operations or other desired parameter values (or configurations dependent upon parameter values) to different data stores types (e.g., storage engine A supports operations 1A, 1B, and 1C, storage engine B supports operations 1A and 1C, etc.). In some embodiments, the alternative target data store may be included in the result of the validation of the migration task, as indicated at 832. For example, target data store type identification and other configuration information may be provided so that a use can manually provision or obtain a target data store matching or similar to the recommended alternative target data store and update the migration task to migrate to the newly provisioned/obtained target data store. In some embodiments, a user interface element (e.g., a programmatic interface call or graphical user interface element) may be included that if selected triggers automated provisioning service (e.g., by submitting calls to other provider network services to obtain a data store matching the recommended alternative data store) and automatically updating the migration task to point the migration to the provisioned target data store.

As indicated at 840, in some embodiments, a severity classification for the invalid parameter may be determined for inclusion in a result of the invalidation. A rating or scale, for instance, may be visually (e.g., color coding) or textually (e.g., "Critical" "Moderate" "Low") determined, in some embodiments. The arrangement or position of validation results (e.g., displaying "critical" validation results at the top of results) may be determined according to the severity classification, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
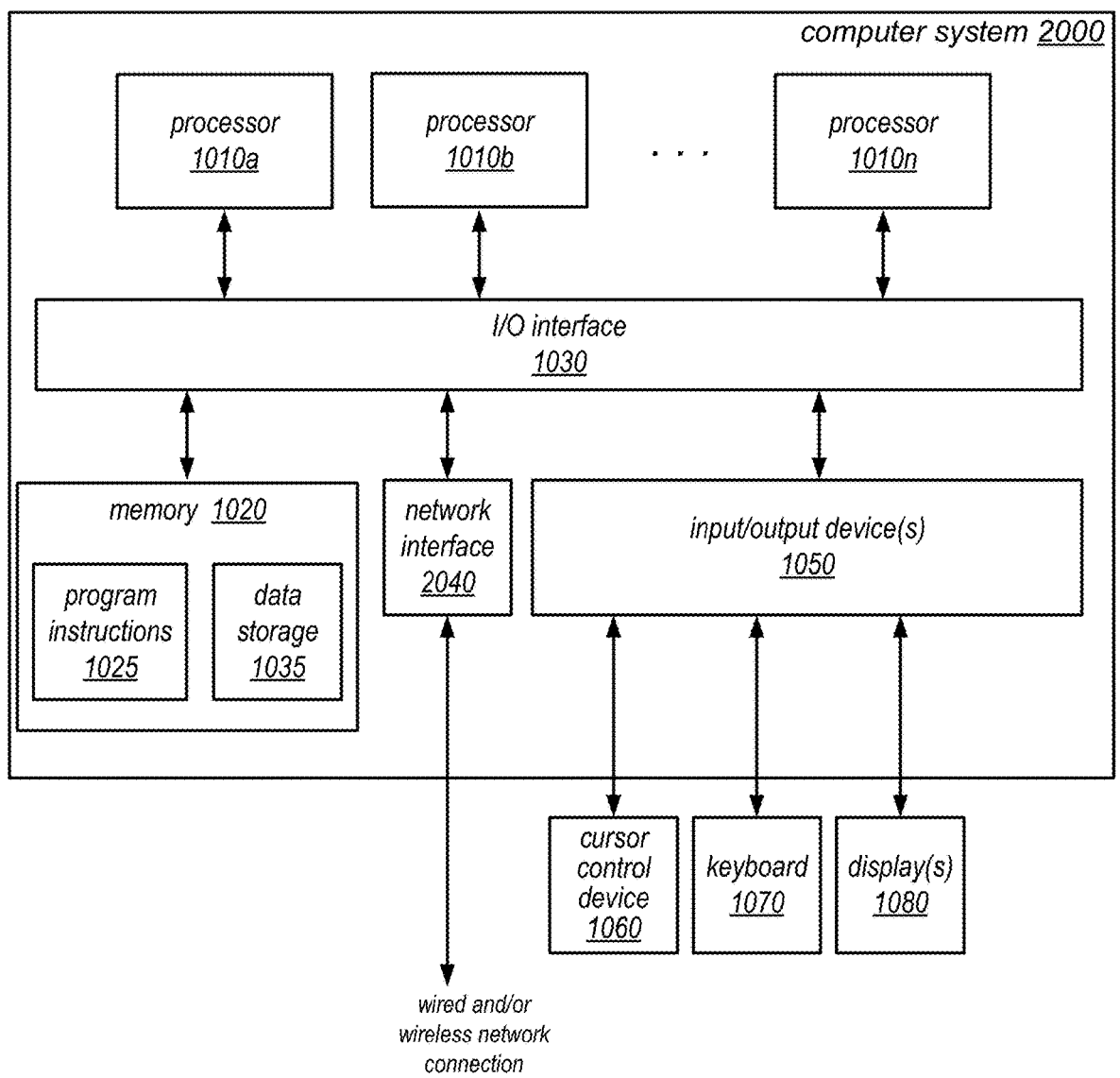
FIG. 9 illustrates an example system that may implement the various methods, techniques, and systems described herein, according to some embodiments.

Embodiments of migration task validation before data migration as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
  receive, via an interface, a request to create a migration task to be validated, wherein the migration task is to migrate data from a first data store to a second data store;
  identify one or more validations to perform with respect to the migration task;
  evaluate one or more parameter values that are configurable to direct migration of the data as part of the migration task according to the identified validations;
  responsive to a determination that the migration task is invalid from the evaluation of the one or more parameter values, determine whether a modification to at least one of the one or more parameter values will result in validity of the migration task;
  generate a result for the validations that includes whether the modification to the at least one of the one or more parameter values will result in the validity of the migration task before the data is migrated from the first data store to the second data store; and
  provide the result via the interface.

2. The system of claim 1, wherein the request further identifies one or more different types of validations to perform for the migration task, wherein the identified one or more validations are identified according to the different types of validations identified in the request.

3. The system of claim 1, wherein the modification is:
a corrective action to modify an invalid parameter of the migration task indicated in the result; or
a recommended alternative target data store to cure an invalid parameter of the migration task indicated in the result.

4. The system of claim 1, wherein the at least one processor is implemented as part of a data migration service of a provider network, wherein the second data store is hosted as part of another service of the provider network, and wherein the interface is an interface for the data migration service.

5. A method, comprising:
- identifying a migration task to be validated, wherein the migration task is to migrate data from a first data store to a second data store;
- evaluating one or more parameter values that are configurable to direct migration of the data as part of the migration task;
- determining whether the migration task is valid based, at least in part, on the evaluation of the one or more parameter values before the data is migrated from the first data store to the second data store;
- responsive to determining that the migration task is invalid from the evaluation of the one or more parameter values, determining whether a modification to at least one of the one or more parameters will result in validity of the migration task; and
- indicating to a user a result of whether the migration task is valid that includes whether the modification to the at least one of the one or more parameter values will result in the validity of the migration task.

6. The method of claim 5, further comprising:
- receiving a request to create the migration task via an interface, wherein the request identifies the migration task for validation.

7. The method of claim 6, wherein the request further identifies one or more different types of validations to perform for the migration task, wherein the identifying the migration task to be validated is based on the different types of validations identified in the request, and wherein the evaluation of the parameter values is performed according to the identified one or more validations.

8. The method of claim 5, wherein the result comprises a corrective action to modify an invalid parameter of the migration task indicated in the result.

9. The method of claim 8, further comprising:
- performing the corrective action to modify the invalid parameter of the migration task in response to a permission received via an interface.

10. The method of claim 5, wherein the result comprises a recommended alternative target data store to cure an invalid parameter of the migration task indicated in the result.

11. The method of claim 10, further comprising:
- modifying the migration task to replace the second data store with the alternative target data store in response to a permission received via an interface.

12. The method of claim 5, wherein the identifying, the evaluating, the determining, and the providing are performed in response to an input of the one or more parameter values in a task creation in a user interface.

13. The method of claim 5, wherein the first data store is a first type of database, wherein the second data store is a second type of database, wherein the second data store is hosted within a provider network and wherein the first data store is hosted external to the provider network.

14. A non-transitory, computer-readable storage medium, storing program instructions that when executed by one or more computing devices cause the one or more computing devices to implement:
- receiving, via an interface, a request to create a migration task, wherein the migration task is to migrate data from a first data store to a second data store;
- identifying the migration task for validation;
- evaluating one or more parameter values that are configurable to direct migration of the data as part of the migration task;
- determining whether the migration task is valid based, at least in part, on the evaluation of the one or more parameters before the data is migrated from the first data store to the second data store;
- responsive to determining that the migration task is invalid from the evaluation of the one or more parameter values, determining whether a modification to at least one of the one or more of the parameters will result in validity of the migration task; and
- providing, via the interface, a result of whether the migration task is valid to a user that includes whether the modification to the at least one of the one or more parameter values will result in the validity of the migration task.

15. The non-transitory, computer-readable storage medium of claim 14, wherein the request further identifies one or more different types of validations to perform for the migration task, wherein identifying the migration task for validation identifies one or more validations to perform with respect to the migration task based on the different types of validations identified in the request, and wherein the evaluation of the parameter values is performed according to the identified one or more validations.

16. The non-transitory, computer-readable storage medium of claim 15, wherein another request to create a second migration task is received, wherein the second migration task is to migrate other data from a third data store to a fourth data store, wherein the identifying, the evaluating, the determining, and the providing are performed for the second migration task, wherein the other request further identifies another one or more types of validations to perform for the second migration task, wherein at least one of the other one or more types of validations is different than the one or more types of validations for the migration task.

17. The non-transitory, computer-readable storage medium of claim 14, wherein the result comprises a recommended alternative target data store to cure an invalid parameter of the migration task indicated in the result.

18. The non-transitory, computer-readable storage medium of claim 17, wherein the program instructions cause the one or more computing devices to further implement:
- in response to receiving a permission via the interface:
  - provisioning a third data store according to the recommended alternative target data store; and
  - modifying the migration task to replace the second data store with the third data store.

19. The non-transitory, computer-readable storage medium of claim 14, wherein the result classifies different invalid parameters of the migration task according to different severities.

20. The non-transitory, computer-readable storage medium of claim 14, wherein the one or more computing devices are implemented as part of a data migration service of a provider network, wherein the second data store is hosted as part of another service of the provider network, and wherein the first data store is hosted external to the provider network.

* * * * *